Patented July 9, 1940

2,207,597

UNITED STATES PATENT OFFICE 2,207,597

DECOLORIZING TITANIUM TETRACHLORIDE

Alphonse Pechukas, Barberton, Ohio, assignor to Pittsburgh Plate Glass Company, Allegheny County, Pa., a corporation of Pennsylvania No Drawing. Application October 27, 1938, Serial No. 237,303

7 Claims. (Cl. 23—87)

This invention relates to the decolorizing of titanium tetrachloride. While pure titanium tetrachloride is a water-white liquid, the product which is obtained on the market or by the usual chlorination processes often possesses a characteristic undesirable yellow or brownish color. In accordance with my invention, I have found that this color may be removed with a suitable adsorbent. Various adsorbents, such as silica gel, activated alumina, adsorbent clays, such as bentonite, fuller's earth, china clay, kaolinite, etc., bauxite, titanium dioxide, such as may be prepared by decomposition of titanium tetrachloride, or other well known adsorbents may be used. In order to inhibit substantial interaction of the adsorbent with titanium tetrachloride, it is found preferable to use an adsorbent which is substantially inert to weak acids.

The process may be conducted in any convenient manner which will insure the required contact between the adsorbent and the titanium tetrachloride. I have found that the decolorizing process may be carried out rapidly by application of heat during contact. The tetrachloride may be treated either as a liquid or as a vapor. When it is treated in the liquid state, it is preferred to heat the liquid in contact with the adsorbent under a reflux condenser for a suitable period of time and subsequently to distill and condense the purified titanium tetrachloride. Since the tetrachloride is readily hydrolyzed in a moist atmosphere, it is preferred to avoid the presence of moisture. Thus, the process may be conducted in a dry atmosphere of suitable gases or vapors such as carbon dioxide, dry air, or nitrogen. If desired, however, the process may be conducted in the substantial absence of these agents. In addition, the distillation step may be dispensed with and the tetrachloride after being contacted with the adsorbent for a suitable period of time, may be removed by other methods, such as settling or filtration or both.

Where the titanium tetrachloride is to be treated in the vapor state, I have found it convenient to pass the vapors through a suitable column containing the adsorbent. If desired, a portion of the vapors may be permitted to condense in the column and to flow back into the still or other source of the titanium tetrachloride vapors. The process may be carried out using both vapor and liquid contact in suitable manner, for example, by heating liquid titanium tetrachloride in contact with the adsorbent and contacting the distilling vapors with a further amount of adsorbent. In some cases it is found desirable to conduct the treatment in the presence of gaseous or liquid diluents, such as air, nitrogen, carbon dioxide, silicon tetrachloride, stannic chloride, or carbon tetrachloride.

The time and temperature of treatment is capable of considerable variation, being dependent upon the initial color of the liquid and the amount of adsorbent used. Where the decolorization is secured by liquid contact, refluxing at 125–150° C. for a period of time, generally in excess of about 10 minutes, followed by distillation if found to be suitable. In treating the vapors, any convenient temperature above the boiling point of the titanium tetrachloride is found to be suitable but it is preferred to conduct the process at a temperature such that substantial decomposition of the tetrachloride is avoided.

The activity of the adsorbent may be decreased after extended use. This activity may be restored in any convenient manner, such as by treatment with steam, water, solutions of acids or alkalies, etc., and subsequent heating to high temperatures for a substantial period of time. In certain cases, the adsorbent may be revivified merely by heating in an inert atmosphere. The extent and nature of the revivifying treatment is dependent upon the degree of contamination of the adsorbent.

The following examples are illustrative:

Example I 100 parts of yellow titanium tetrachloride and 12 parts of silica gel were agitated and heated under a reflux condenser at a temperature of 135° C. for a period of 15 minutes. The treated mixture was then distilled rapidly, and a water-white product was secured. The silica gel was again treated with a like quantity of titanium tetrachloride which was refluxed for ½ hour, and then distilled to recover water white material. This process was repeated twice again, with reflux times of 45 and 60 minutes, respectively, yielding water-clear materials.

Example II 100 parts of yellow titanium tetrachloride and 15 parts of activated alumina were agitated and heated under a reflux condenser at a temperature of 135° C. for a period of 4 hours. The treated mixture was filtered, and yielded a clear-white titanium tetrachloride.

Example III

A quantity of yellow titanium tetrachloride was distilled and the vapors passed through a column containing a quantity of bentonite which was maintained at a temperature of 200° C. The treated vapors were condensed after treatment and a water-white liquid was thereby obtained.

Although the invention has been described in connection with the specific details of certain embodiments thereof, it is not intended that such details shall be regarded as limitations upon the scope of the invention except insofar as included in the accompanying claims.

While the process has been described with particular reference to the treatment of titanium tetrachloride, it is not so limited since other tetrahalides, such as titanium tetrabromide or tetrafluoride may be decolorized in similar manner.

I claim:

1. A process of decolorizing colored titanium tetrachloride which comprises contacting vapors of said tetrachloride with an adsorbent.

2. A process of decolorizing colored titanium tetrachloride which comprises contacting vapors of said tetrachloride with silica gel.

3. A process of decolorizing colored titanium tetrachloride which comprises contacting vapors of said tetrachloride with active alumina.

4. A process of decolorizing colored titanium tetrachloride which comprises contacting vapors of said tetrachloride with an adsorptive clay.

5. A process of decolorizing colored titanium tetrahalide which comprises contacting vapors of said tetrahalide with an adsorbent.

6. In the process of decolorizing a titanium tetrahalide containing colored ingredients which normally distill with the tetrahalide the step which comprises heating the tetrahalide with an adsorbent of the group consisting of silica gel, adsorbent clay, active alumina, and adsorbent titanium dioxide at a temperature of at least about 125° C. and recovering decolorized titanium tetrahalide.

7. The process of claim 6 wherein the tetrahalide is titanium tetrachloride.

ALPHONSE PECHUKAS.